(12) United States Patent
Seger

(10) Patent No.: US 8,214,452 B2
(45) Date of Patent: Jul. 3, 2012

(54) MONITORING OF WINDOWS ON COMPUTERS

(75) Inventor: Mark J. Seger, Harvard, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 897 days.

(21) Appl. No.: 11/830,029

(22) Filed: Jul. 30, 2007

(65) Prior Publication Data

US 2009/0037557 A1 Feb. 5, 2009

(51) Int. Cl.
*G06F 15/16* (2006.01)

(52) U.S. Cl. ........ 709/217; 709/224; 719/321; 719/328; 719/329; 703/21; 703/22; 703/23; 703/24; 703/16; 703/17

(58) Field of Classification Search ............... 709/217, 709/224; 713/13–23; 719/328–329, 321; 703/13, 16–17, 21–24
See application file for complete search history.

(56) References Cited

U.S. PATENT DOCUMENTS

| | | | | |
|---|---|---|---|---|
| 4,819,189 A * | 4/1989 | Kikuchi et al. | ............... | 715/797 |
| 4,859,995 A * | 8/1989 | Hansen et al. | ............... | 345/163 |
| 5,717,604 A * | 2/1998 | Wiggins | ........................ | 709/229 |
| 6,173,246 B1 * | 1/2001 | Billups, III | ..................... | 703/22 |
| 6,329,984 B1 * | 12/2001 | Boss et al. | ..................... | 715/723 |
| 6,567,937 B1 * | 5/2003 | Flores et al. | ..................... | 714/46 |
| 6,850,257 B1 * | 2/2005 | Colleran et al. | ............. | 715/804 |
| 2005/0086344 A1 * | 4/2005 | Suesserman | ................. | 709/227 |
| 2006/0103508 A1 * | 5/2006 | Sato | ........................ | 340/286.01 |
| 2007/0085825 A1 * | 4/2007 | Geffin et al. | ................. | 345/157 |
| 2007/0300179 A1 * | 12/2007 | Friedlander | .................. | 715/781 |

* cited by examiner

*Primary Examiner* — Haresh N Patel
*Assistant Examiner* — Mohammad Siddiqi

(57) ABSTRACT

Embodiments include methods, apparatus, and systems for monitoring windows on computers. In one embodiment, movement of a mouse or cursor in a focused window of the computer is analyzed to determine whether an application is properly executing in the computer.

19 Claims, 3 Drawing Sheets

MONITORING OF WINDOWS ON COMPUTERS

BACKGROUND

Software applications are often tested in various simulation environments before being released. Testing systems are typically used for application verification and benchmarking that perform controlled tests. During testing, user input or user interaction is simulated and input into the testing system.

On occasions these testing systems get out of synchronization with the systems being tested. As a result, a hang or error occurs. In order to notice and then record such errors, a person must actually watch the user interfaces on each system or computer being tested. This requirement also means that testing can only be conducted when there is someone physically available to monitor the testing, which is typically during business hours.

DETAILED DESCRIPTION

Figure 1:
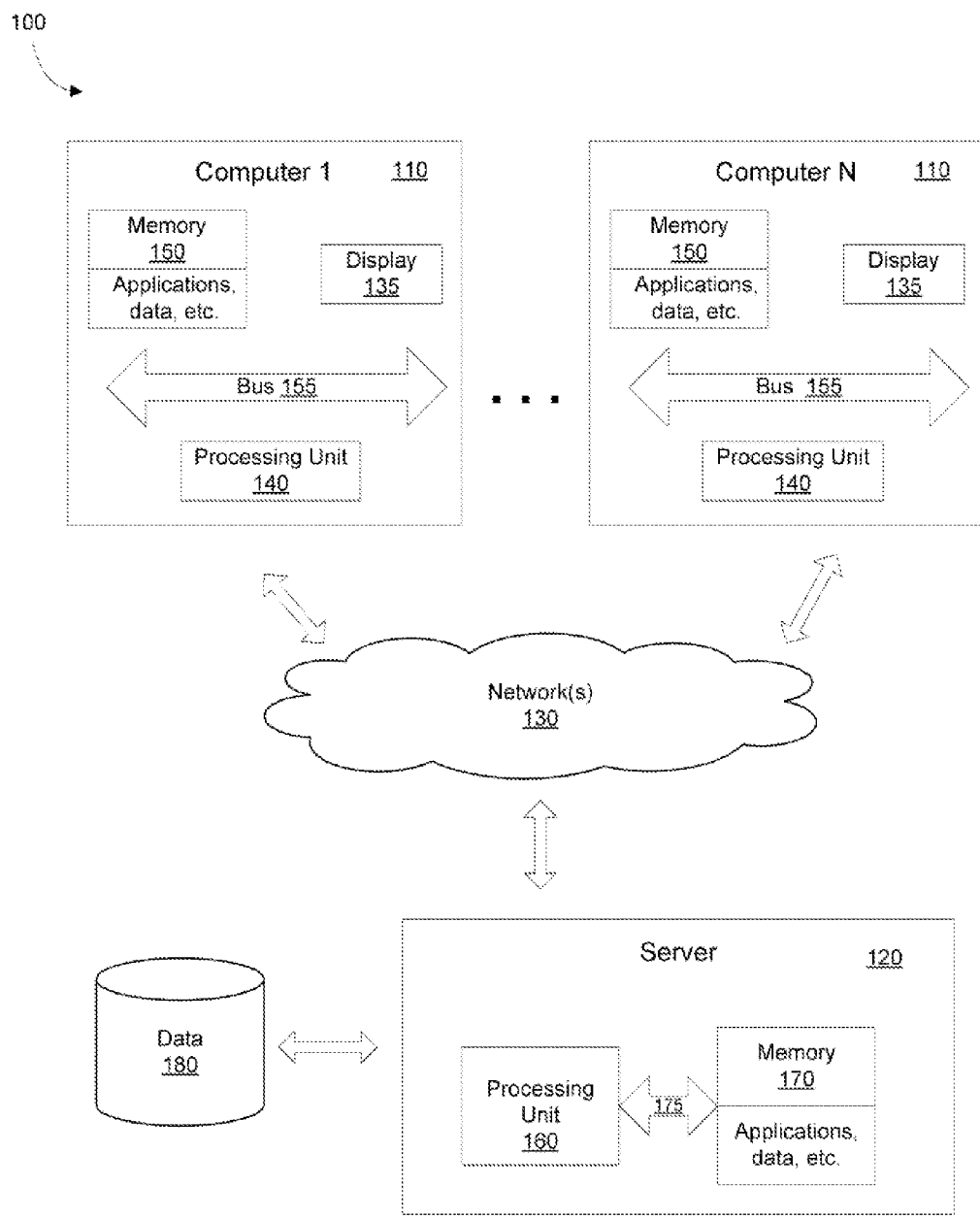
FIG. 1 is a block diagram of a computer system in accordance with an exemplary embodiment.

Exemplary embodiments are directed to methods, systems, and apparatus for monitoring of windows based interfaces on one or more remote computers. One embodiment provides a mechanism for determining a state of current activity on a remote computer running a windowing based system and/or application undergoing simulation or testing. A monitoring daemon is installed on one or more remote systems, such as remote computers. The remote computers then periodically send the name of an active or focused window as well as cursor and mouse positions to a central manager or server. This manager then determines what activity is taking place on each of the remote computers and whether applications are properly executing. For instance, the central manager determines if an idle system is properly remaining idle or a system that is supposed to have continuous activity is actually hanging.

Software applications are often tested in various simulation environments before being released. Testing systems are typically used for application verification and benchmarking that perform controlled tests. During testing, user input or user interaction is simulated and automatically input into the testing system. Exemplary embodiments monitor these simulations, collect data from plural remote computers, and assess whether the remote computers are properly executing the applications undergoing simulation.

One exemplary embodiment includes two software modules, a client module running on one or more remote computers and a server module running on a server computer. The client module runs on each remote computer and reports the 3-tuple: the name of the active window, the current cursor position, and the current mouse position. These values are transmitted from the remote computers back to the server module where the information is evaluated to determine when or if one or more of the computers encounters an error condition, example a hung state.

Exemplary embodiments execute on the remote computers and one or more servers without interfering with the operation of the application being tested. The server tracks the 3-tuple from each client and determines whether the applications are properly executing. For instance, the server repeatedly compares values of the 3-tuple over a time period to determine whether an application executing on the remote computer is properly running. The period of time can vary based on the application being tested.

When the server determines there is an hang (example, an application encounters an error that causes the application to stop running), the server notifies a user that a hang has occurred. For instance, the server displays a message on the terminal if being run in an attended state, writes or records occurrence of an error event to a log file for later analysis, initiates a program to send notification to a user (example, send a text or email), or performs a corrective action to cure the hang or error state. Additionally, the server can record when errors or hangs are corrected or record when errors/problems are resolved.

Exemplary embodiments enable automated monitoring of applications executing on remote computers. Since the monitoring is automated, a human operator is not required to watch monitors and look for the occurrence of an error condition. Such error conditions are detected, recorded, and reported with exemplary embodiments.

One embodiment enables a software application testing system to perform application verification and benchmarking. During testing, user input or user interaction is simulated and automatically input into the testing system. For example, user input is simulated on a plurality of remote computers. On occasions these testing systems get out of synchronization with the systems being tested. As a result, a hang occurs caused by an error in the input. Exemplary embodiments provide automated detection of a hung system and automatically take corrective action. Exemplary embodiments eliminate the need for human interaction and allow testing of applications to be extended beyond regular business hours.

FIG. 1 is a block diagram of a computer system 100 in accordance with an exemplary embodiment. The computer system 100 includes a plurality of workstations or computers 110 (labeled computer 1 through computer N) connected to another computer 120 (such as a server computer) through one or more networks 130.

Each computer 110 comprises a display 135 and a processing unit 140 (such as one or more processors of central processing units, CPUs) for controlling the overall operation of memory 150 (such as random access memory (RAM) for temporary data storage and read only memory (ROM) for permanent data storage) and algorithms (which may be located in memory 150 or other location). The memory 150, for example, stores data, control programs, and one or more programs for executing exemplary embodiments (such as flow diagrams of FIGS. 2 and 3). The processing unit 140 communicates with memory 150, display 135, and many other components via buses 155.

Computer or server 120 comprises a processing unit 160 (such as one or more processors of central processing units, CPUs) for controlling the overall operation of memory 170 (such as random access memory (RAM) for temporary data storage and read only memory (ROM) for permanent data storage) and algorithms (which may be located in memory 170 or other location). The memory 170, for example, stores data, control programs, and one or more programs for executing exemplary embodiments (such as flow diagrams of FIGS. 2 and 3). The processing unit 160 communicates with memory 170 and many other components via buses 175.

Server 120 is also connected to a database 180 for storing data structures, computer readable instructions, program modules, and other data for server 120.

Exemplary embodiments are not limited to any particular type or number of databases, computers, or servers. Computers 110 and 120, for example, include various portable and non-portable computers and/or electronic devices. Exemplary computers include, but are not limited to, computers (portable and non-portable), servers, main frame computers, distributed computing devices, laptops, and other electronic devices and systems whether such devices and systems are portable or non-portable.

Exemplary embodiments are not limited to any particular type of network 130. By way of example, the network 130 includes, but is not limited to, one or more of local area networks (LANs), wide area networks (WANs), the internet, etc.

In one exemplary embodiment, one or more applications are run on each computer 110 dining a user simulation of the applications. The simulation process simulates plural users running the application software, for example, on personal computers or workstations. During the simulation, information is collected or gathered at each of the computers 110, and this information is transmitted to the computer 120 for monitoring and analysis.

During the simulation, if one or more of the computers 110 becomes stuck, hung, or otherwise encounters an error, the server 120 detects this condition and initiates a predetermined action (such as recording the error condition, notifying a user, and/or correcting the error condition). As such, a user or person is not required to physically monitor the simulation occurring on each of the computers 110 since the server 120 automatically monitors and analyzes simulation of the application executing on the computers 110.

Figure 2:
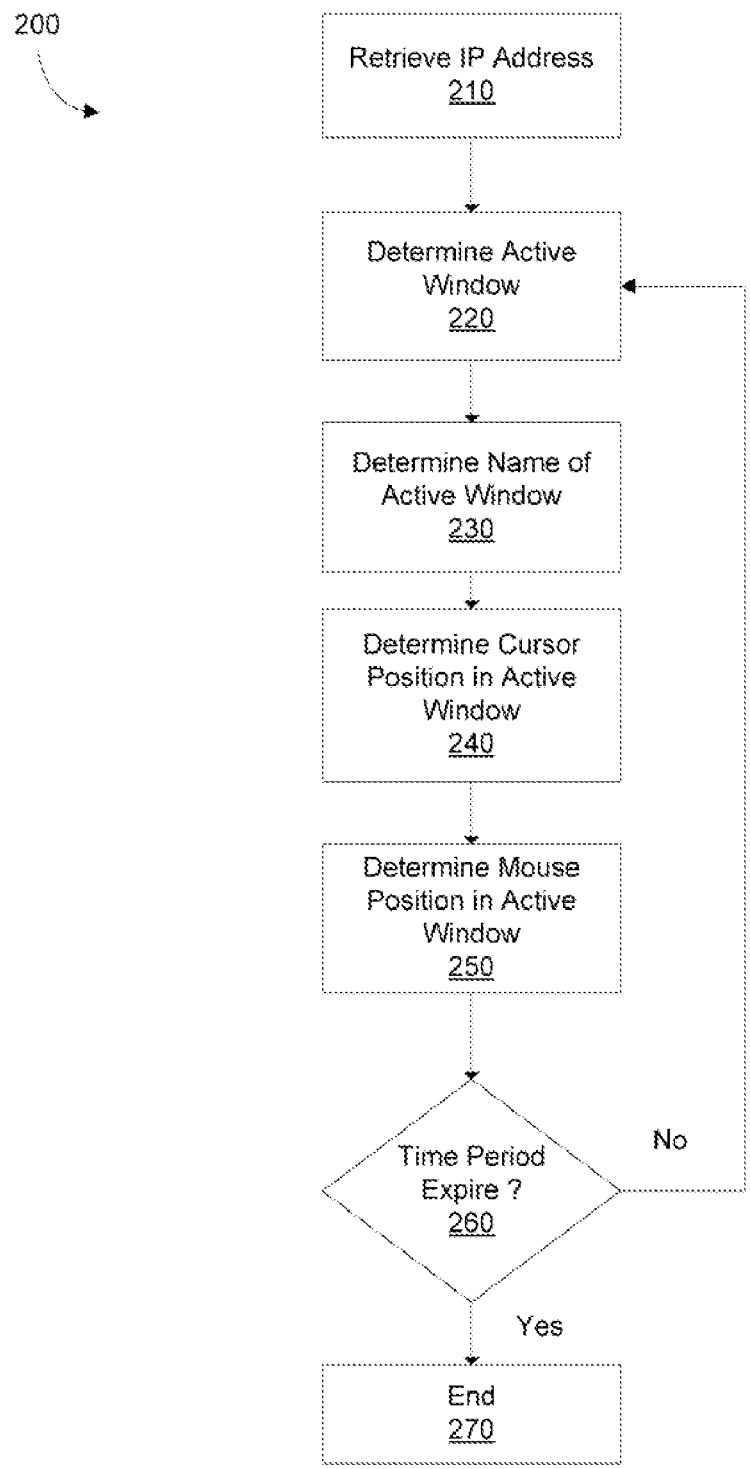
FIG. 2 is a flow diagram for a client side module in accordance with an exemplary embodiment.

FIG. 2 is a flow diagram 200 for a client side module in accordance with an exemplary embodiment.

According to block 210, each computer retrieves or obtains a unique identifier, such as an IP address (Internet Protocol address) or MAC address (Media Access Control address). An IP address is a unique address used to identify and communicate over a computer network. For instance, each computer 110 retrieves its IP address.

According to block 220, a determination is made as to which window is active on the computer. For instance, a determination is made as to which window being displayed is focused. The currently or actively focused window or window on top receives active tasks from a user (example, mouse clicks, data entry, cursor movements, etc.).

According to block 230, a determination is made of a name of the active or focused window. The active or focused window is identified in order to distinguish this window from other windows (example, windows displayed but not focused, windows minimized, etc.). By way of example, an active window is identified with a title or other identification to distinguish it from other running or displayed but not focused windows.

According to block 240, a determination is made of a position of a cursor in the active window. As the cursor is moved around in a window, the coordinate locations of the cursor change. At a given instant in time, a location of the cursor is determined and recorded.

According to block 250, a determination is made of a position of a mouse in the active window. As the mouse is moved around in a window, the coordinate locations of the mouse change. A location of the mouse is determined and recorded.

The locations of the mouse and cursor are recorded at a same instant in time. These locations can be the same (i.e., identical) or different. For example, the cursor can be positioned at a first location in the window at a data entry point or location for receiving text input from a user. At the same time, the mouse can be positioned at a second location in the window with the second location being separate and different from the first location.

According to the block 260, a question is asked as to whether a time period has expired for collecting information per blocks 220-250. If the answer to this question is "no" then flow proceeds back to block 220 for collecting the information again. If the answer to this question is "yes" then flow proceeds to block 270 and ends.

Exemplary embodiments are not limited to any particular time period for collecting the information in one or more of blocks 220-250. This information can be collected over an extended period of time (example, hours or days) while the application is being tested and/or simulated on the computers. Further, the information can be collected with different frequencies or rates (example, once every second, every minute, every hour, etc.). In one embodiment, a user enters a time period for collecting the information and a frequency at which the information is collected (i.e., how often the information is collected).

Figure 3:
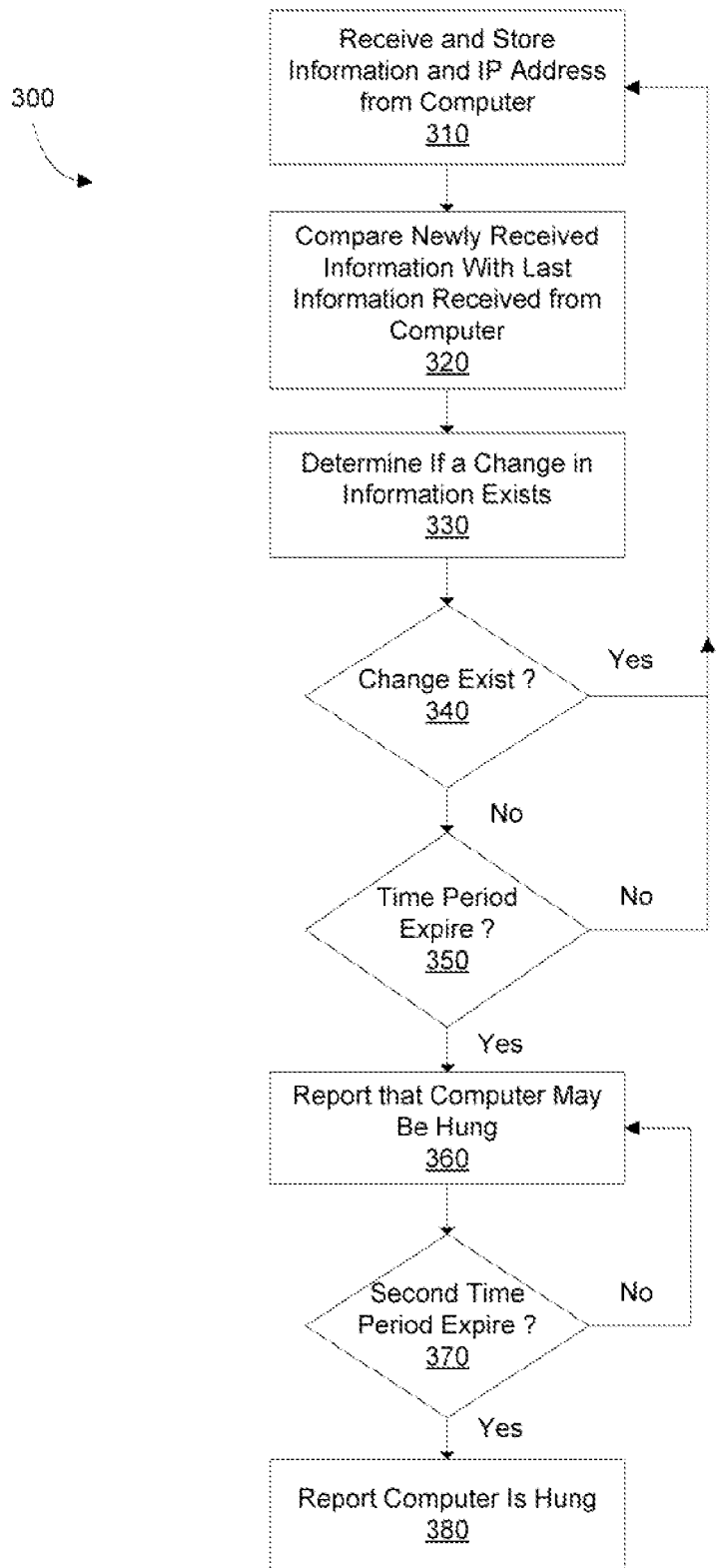
FIG. 3 is a flow diagram for a server side module in accordance with an exemplary embodiment.

FIG. 3 is a flow diagram 300 for a server side module in accordance with an exemplary embodiment.

According to block 310, a computer (example, computer 120 in FIG. 1) receives and stores information and unique identifiers from computers (example, computers 110 in FIG. 1). By way of example, as discussed in connection with FIG. 2, each computer 110 retrieves information (such as one or more of information discussed in block 220-250) and then transmits this information to a server. The information received is identified and associated with each specific computer using the unique identifier (example, IP address) of the transmitting computer. For instance, each computer 110 transmits the collected information (blocks 230-250) along with its corresponding unique identifier (example, IP address) to the server 120.

According to block 320, the server compares the newly received information with the last information received from the computer. A determination is then made as to whether a change in the information exists as shown in block 330.

By way of example, a first computer sends at time t1 to the server (1) the name of active window, (2) cursor position in the active window, and (3) mouse position in the active window. Then at time t2 (subsequent to time t1), the first computer sends to the server (1) the name of active window, (2) cursor position in the active window, and (3) mouse position in the active window. The server performs a comparison between the information received at time t1 and the information received at time t2. For instance, values of the 3-tuple are compared with each other.

According to block 340, a question is asked as to whether the information has changed. In other words, a determination is made as to whether the information received at time t1 for the first computer has changed with respect to the information received at time t2. If the answer to this question is "yes" then flow proceeds back to block 310. If the answer to this question is "no" then flow proceeds to block 350.

As one example, the comparison reveals movement or changes to the information. For instance, the comparison reveals whether or when the mouse or cursor moved or changed position in the active window dining the time period.

As another example, the comparison reveals whether or when the active window was focused, de-focused, minimized, or maximized.

At block 350, a question is asked as to whether a time period has expired for determining whether the collected information has changed. If the answer to this question is "no" then flow proceeds back to block 310. If the answer to this question is "yes" then flow proceeds to block 360.

In one embodiment, the server makes a determination as to whether an application is correctly executing on one or more of the computers 110. During a simulation for instance, one of the computers can become hung or otherwise stop working properly. When this occurs, one or more of the information being retrieved will remain constant. For instance, the first computer sends at time t1 to the server value 1 for the name of active window, value 2 for the cursor position in the active window, and value 3 for the mouse position in the active window. Then at time t2 (after expiration of a predetermined time period per block 350), the first computer sends to the server the same information. In other words, the active window still has value 2 for the cursor position and value 3 of the mouse position. This comparison indicates that the application may be hung or stuck since either or both of the cursor and mouse positions should have changed during the predetermined time period.

According to block 360, after expiration of the predetermined time period, the server determines that the computer may be hung or otherwise encountering an error since one or more of the values of the information did not change. At this juncture, the server can wait for a second predetermined time period.

At block 370, a question is asked as to whether a second time period has expired. If the answer to this question is "no" then flow proceeds back to block 350. If the answer to this question is "yes" then flow proceeds to block 380 wherein a determination is made that the computer is actually hung or otherwise encountering an error.

Once an error condition is detected, the server can perform one or more of various actions, such as, but not limited to, correcting the error condition, reporting the error condition to a user, logging or storing the error condition, rebooting the computer experiencing the error condition, etc.

In one exemplary embodiment, one or more blocks in the flow diagrams are automated. In other words, apparatus, systems, and methods occur automatically. As used herein, the terms "automated" or "automatically" (and like variations thereof) mean controlled operation of an apparatus, system, and/or process using computers and/or mechanical/electrical devices without the necessity of human intervention, observation, effort and/or decision.

The flow diagrams in accordance with exemplary embodiments are provided as examples and should not be construed to limit other embodiments within the scope of the invention. For instance, the blocks should not be construed as steps that must proceed in a particular order. Additional blocks/steps may be added, some blocks/steps removed, or the order of the blocks/steps altered and still be within the scope of the invention. Further, blocks within different figures can be added to or exchanged with other blocks in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory and accessed by the processor using the bus. The techniques and methods for embodying software programming code in memory, on physical media, and/or distributing software code via networks are well known and will not be further discussed herein.

The above discussion is meant to be illustrative of the principles and various exemplary embodiments. Numerous variations and modifications will become apparent to those skilled in the art once the above disclosure is fully appreciated. It is intended that the following claims be interpreted to embrace all such variations and modifications.

What is claimed is:

1. A method executed by a computer, comprising:
    collecting, at time t1 during simulation of a software application on a computer, a
first value for a cursor position on a display and a first value for a mouse position on the display;
    collecting, at time t2 during simulation of the software application on the computer, a second value for the cursor position and a second value for the mouse position on the display; and
    comparing the first value for the cursor position to the second value for the cursor position and the first value for the mouse position to the second value for the mouse position to determine whether the software application is properly executing on the computer;
    determining that the software application is hung when the first value for the cursor position, the second value for the cursor position, the first value for the mouse position, and the second value for the mouse position do not change from the time t1 to the time t2.

2. The method of claim 1, wherein the first value for the cursor position, the second value for the cursor position, the first value for the mouse position, and the second value for the mouse position are collected for a focused window of the software application during the simulation.

3. The method of claim 1 further comprising, determining that the software application is improperly executing when the first value for the cursor position equals the second value for the cursor position and the first value for the mouse position equals the second value for the mouse position.

4. The method of claim 1 further comprising, monitoring movement of a cursor position in an active window during the time t1 to the time t2 to determine when the software application is properly executing on the computer.

5. The method of claim 1 further comprising, monitoring movement of a mouse position in an active window during the time t1 to the time t2 to determine when the software application is properly executing on the computer.

6. A non-transitory computer readable medium having instructions for causing a computer to execute a method, comprising:

monitoring, during a simulation of an application, movement of one of a cursor position or a mouse position in an active window on a display of a first computer executing the application;

transmitting values of the movement to a second computer;

analyzing the values of the movement to determine whether the application is properly executing on the first computer during the simulation; and determining that the application is hung when a first value for a cursor position, a second value for the cursor position, a first value for a mouse position, and a second value for the mouse position do not change from time t1 to the time t2, wherein, at time t1, the first value for the cursor position and the first value for the mouse position are collected, at time t2 the second value for the cursor position and the second value for the mouse position are collected.

7. The non-transitory computer readable medium of claim 6 further comprising, comparing the values of the movement to determine whether the cursor position and the mouse position changed during a time period to determine if the application is properly executing.

8. The non-transitory computer readable medium of claim 6 further comprising, transmitting a location of the cursor position in the active window and a location of the mouse in the active window from the first computer to the second computer.

9. The non-transitory computer readable medium of claim 6 further comprising, determining that the application is hung when the cursor position and the mouse position do not change in the active window during a time period.

10. The non-transitory computer readable medium of claim 6 further comprising, reporting an error condition to a user when the cursor position and the mouse position do not change in the active window during a time period.

11. The non-transitory computer readable medium of claim 6 further comprising, rebooting the first computer when the cursor position and the mouse position do not change in the active window during a time period.

12. The non-transitory computer readable medium of claim 6 further comprising, comparing values for the cursor and mouse positions at a first time with values for the cursor and mouse positions at a second time, the second time being subsequent to the first time.

13. The non-transitory computer readable medium of claim 6 further comprising, simulating user input into the first computer in order to simulate movement of the cursor position and the mouse position.

14. The non-transitory computer readable medium of claim 6 further comprising, reporting to a user that the first computer is in a hung state when the cursor position and mouse position do not move.

15. A computer system, comprising:

a memory storing an algorithm;

a processor that executes the algorithm to:

receive data from a computer, the data indicating movement of a mouse or cursor in a focused window on a display of the computer executing an application;

analyze the data to determine when in time the mouse or the cursor moved in the focused window of the computer in order to determine whether the application is properly executing; and determine that the application is hung when a first value for a cursor position, a second value for the cursor position, a first value for a mouse position, and a second value for the mouse position do not change from time t1 to the time t2, wherein, at time t1, the first value for the cursor position and the first value for the mouse position are collected, at time t2 the second value for the cursor position and the second value for the mouse position are collected.

16. The computer system of claim 15 wherein the processor further executes the algorithm to:

receive second data from the computer for movement of the mouse or the cursor in the focused window of the computer;

compare the data with the second data to determine when in time the mouse or the cursor moved in the focused window of the computer.

17. The computer system of claim 15 wherein the processor further executes the algorithm to report an error condition to a user when the mouse or the cursor does not move during a time period.

18. The computer system of claim 15 wherein the processor further executes the algorithm to report to a user that the computer is hung when a location of the mouse and a location of the cursor remain constant over a time period.

19. The computer system of claim 15 further comprising, a plurality of workstation computers that execute the application during a simulated execution of the application.

* * * * *